(12) United States Patent
Rapparini (10) Patent No.: US 11,192,290 B2
(45) Date of Patent: Dec. 7, 2021

(54) MACHINE FOR THERMOFORMING AND METHOD FOR THERMOFORMING

(71) Applicant: AROMA SYSTEM S.R.L., Bologna (IT)

(72) Inventor: Gino Rapparini, Bologna (IT)

(73) Assignee: Aroma System, S.R.L., Bologna (IT)

( * ) Notice: Subject to any disclaimer, the term of this patent is extended or adjusted under 35 U.S.C. 154(b) by 0 days.

(21) Appl. No.: 15/542,007

(22) PCT Filed: Sep. 13, 2016

(86) PCT No.: PCT/IB2016/055438
§ 371 (c)(1),
(2) Date: Jul. 6, 2017

(87) PCT Pub. No.: WO2017/055954
PCT Pub. Date: Apr. 6, 2017

(65) Prior Publication Data
US 2018/0022012 A1 Jan. 25, 2018

(30) Foreign Application Priority Data

Sep. 28, 2015 (IT) .................... 102015000051851

(51) Int. Cl.
*B29C 51/42* (2006.01)
*B29C 51/04* (2006.01)
(Continued)

(52) U.S. Cl.
CPC ............ *B29C 51/421* (2013.01); *B29C 51/04* (2013.01); *B29C 51/08* (2013.01); *B29C 51/162* (2013.01);
(Continued)

(58) Field of Classification Search
CPC ..... B29C 51/002; B29C 51/04; B29C 51/421; B29B 13/023
(Continued)

(56) References Cited

U.S. PATENT DOCUMENTS

| 2,776,452 A | 1/1957 | Chavannes |
| 3,294,387 A | 12/1966 | Chavannes |

(Continued)

FOREIGN PATENT DOCUMENTS

| EP | 0 408 874 | | 1/1991 |
| GB | 1060249 | * | 5/1965 |
| GB | 1060249 | | 3/1967 |

OTHER PUBLICATIONS

"Temperature Resistance of Thermoplastics" (Year: NA).*
(Continued)

*Primary Examiner* — Matthew J Daniels
*Assistant Examiner* — Hana C Page
(74) *Attorney, Agent, or Firm* — Fattibene and Fattibene LLC; Paul A. Fattibene (57) ABSTRACT

A thermoforming machine and a thermoforming method are provided, in particular for producing capsules for obtaining beverages. The capsules (C) are produced from a film (F) of thermoformable material by thermoforming one or more predefined portions (X) of the film. The one or more predefined portions (X) of the film of thermoformable material are pre-heated, i.e. they are heated before being subjected to thermoforming so as to minimize the probability that the film of thermoformable material tears or breaks during thermoforming or after thermoforming.

14 Claims, 7 Drawing Sheets

(51) Int. Cl.
*B29C 51/08* (2006.01)
*B29C 51/26* (2006.01)
*B29C 51/46* (2006.01)
*B29C 51/16* (2006.01)
*B65B 29/02* (2006.01)
*B29C 51/22* (2006.01)
*B65B 47/02* (2006.01)
*B29L 31/00* (2006.01)
*B29K 101/12* (2006.01)

(52) U.S. Cl.
CPC ............ *B29C 51/22* (2013.01); *B29C 51/264* (2013.01); *B29C 51/426* (2013.01); *B29C 51/46* (2013.01); *B65B 29/022* (2017.08); *B65B 47/02* (2013.01); *B29C 51/225* (2013.01); *B29C 2791/001* (2013.01); *B29K 2101/12* (2013.01); *B29K 2995/006* (2013.01); *B29L 2031/7174* (2013.01)

(58) Field of Classification Search
USPC ........................................................ 156/242
See application file for complete search history.

(56) References Cited

U.S. PATENT DOCUMENTS

| | | | | |
|---|---|---|---|---|
| 4,943,406 | A * | 7/1990 | Bocchi | B29C 51/42 264/521 |
| 7,153,530 | B2 * | 12/2006 | Masek | B65D 85/8043 426/77 |
| 7,799,265 | B2 * | 9/2010 | Nakazato | B65D 1/26 264/547 |
| 9,963,256 | B2 * | 5/2018 | Hansen | B65B 29/02 |
| 2002/0027308 | A1 | 3/2002 | Koppenhofer | 264/163 |
| 2006/0113716 | A1 * | 6/2006 | Binda | B29C 65/028 264/545 |
| 2011/0016834 | A1 | 1/2011 | Rapparini | 53/510 |
| 2011/0073607 | A1 * | 3/2011 | Fu | B65D 85/8043 220/711 |
| 2011/0185911 | A1 | 8/2011 | Rapparini | 99/295 |
| 2011/0247975 | A1 * | 10/2011 | Rapparini | B65D 65/466 210/321.6 |
| 2012/0223458 | A1 * | 9/2012 | Sasauchi | B29C 51/002 264/291 |
| 2012/0269933 | A1 | 10/2012 | Rapparini | 426/82 |
| 2015/0119220 | A1 | 4/2015 | Rea et al. | B65B 29/02 |
| 2015/0128525 | A1 * | 5/2015 | Bartoli | B29C 51/04 53/410 |
| 2015/0140251 | A1 * | 5/2015 | Bartoli | B29C 51/262 428/43 |
| 2015/0166204 | A1 | 6/2015 | Rea et al. | B65B 29/02 |

OTHER PUBLICATIONS

Grewell. "Welding of Plastics: Fundamentals and New Developments" (Year: 2007).*

Berins, Thermoforming of Plastic Film and Sheet. SPI Plastics Engineering Handbook of the Society of the Plastics Industry, Inc. (Year: 1991).*

* cited by examiner

MACHINE FOR THERMOFORMING AND METHOD FOR THERMOFORMING

The present invention concerns the field of thermoforming. In particular, the present invention concerns the formation of capsules for obtaining beverages, by thermoforming.

STATE OF THE ART

Different thermoforming machines and methods are known for producing capsules for obtaining beverages from a film of thermoformable material. Examples of such known findings of the state of the art are European patent EP 2 490 962 B1, American patent applications published with numbers US 2011/0247975 A1 and US 2011/0185911 A1 and the PCT applications published with numbers WO2013/189556 A1 and WO2013/189555 A1. The term "thermoforming" is meant to indicate a forming process that comprises heating a given portion of material and shaping the portion thus heated so as to obtain the desired object.

However, it has been observed that the known systems of the state of the art have some problems. In particular, it has been observed that during or after thermoforming the thermoformable material tends to tear or break. This problem has been observed in particular with biodegradable materials according to European standard EN13432 or American standard ASTM6400. For example, this problem has been observed with polylactic acid (PLA) based materials, composites of cellulose and polylactic acid, PHA (Polyhydroxyalkanoates), composites of amide or PBS (Polybutylene succinate). This problem has also been observed with non-biodegradable materials like for example PET (polyethylene terephthalate), PP (polypropylene), PA (polyammide).

A further problem that has been observed concerns the contraction of the thermoformed material that has dilated in the step immediately after thermoforming. This inevitably leads to the reduction of the inner volume of the capsule formed by thermoforming and thus the production of capsules with lower inner volume than the desired volume.

The purpose of the present invention is to at least partially solve one or more of the aforementioned problems. In particular, the purpose of the present invention is to considerably reduce the probability of the thermoformable material tearing or breaking during thermoforming or after thermoforming. Such a purpose is accomplished thanks to the findings as defined by the independent claims. The dependent claims define further particularly advantageous embodiments of the present invention.

SUMMARY

The present invention is based on the idea of performing heating of the film of thermoformable material before performing thermoforming. The inventors have indeed observed that performing heating of the film of thermoformable material before performing thermoforming substantially reduces the probability of the film tearing or breaking during or after thermoforming. Therefore, a thermoforming machine and a thermoforming method, in particular for producing capsules for obtaining beverages, are provided. The capsules are produced from a film of thermoformable material by thermoforming one or more predefined portions of the film. The one or more predefined portions of the film of thermoformable material are pre-heated, i.e. they are heated before being subjected to thermoforming so as to minimise the probability of the film of thermoformable material tearing or breaking during or after thermoforming.

In other words, based on the present invention, the predefined portions of the film of thermoformable material are subjected to two heating steps: a first pre-heating step carried out before thermoforming and a second heating step due to the thermoforming itself.

According to an embodiment of the present invention, a method for producing a capsule for obtaining beverages from a film of thermoformable material is provided comprising the formation of the capsule by thermoforming a predefined portion of the film and in which, before the formation by thermoforming, a heating of the predefined portion of the film is carried out. The term "thermoforming" is meant to indicate a forming process that comprises a step of heating a defined portion of material and a step of shaping the portion thus heated so as to obtain the desired object. Based on the present invention, therefore, the predefined portion of the film is subjected to two heating steps: a first pre-heating step performed before the formation by thermoforming and a second heating step due to the thermoforming itself. It has been observed that the pre-heating of the predefined portion of film of thermoformable material that will subsequently be thermoformed so as to form the capsule in the desired shape and size substantially reduces the probability of the portion itself tearing or breaking during or after thermoforming.

According to a further embodiment of the present invention, no further treatment steps are interposed between the heating of the predefined portion and the thermoforming thereof. In this way, it is ensured that the temperature reached by the predefined portion after heating is maintained or in any case is not too low when the predefined portion will be subjected to thermoforming. In this way, for example, external elements such as gusts of air, suction, treatments for the air like air conditioning and dehumidifiers that act in the production area of the capsules are prevented from having an influence on the temperature reached by the film once preheated. It is also clear that the preheating step can be influenced by the time of the production cycle of the machine but this can be regulated by changing the intensity and/or distance of irradiation of the preheating. For example, if the cycle is quick, it will be necessary to bring the preheater closer to the film so as to irradiate the band involved more and to exploit the short time available, vice-versa if the cycle is slow the preheater will be moved away to prevent overexposure to irradiation damaging (for example burning) the film itself.

According to a further embodiment of the present invention, a method is provided in which the pre-heating is carried out in such a way that the predefined portion of the film reaches a temperature which is higher than or equal to 50° C. and/or lower than or equal to 80° C. Temperatures within this range are particularly effective for minimising the probability of the film breaking during and/or after thermoforming. According to a particular embodiment of the present invention, the thermoforming is such that during thermoforming the film of thermoformable material is heated to a temperature higher than or equal to 100° C. and/or lower than or equal to 190° C.

According to a further embodiment of the present invention, the maximum temperature reached by the predefined portion following heating is in a range from 50% to 100% of the maximum temperature reached by the predefined portion during thermoforming. This range of the ratio between the two temperatures is particularly effective for minimising the probability of the film breaking during and/or after thermoforming.

According to a further embodiment of the present invention, a method is provided in which the step of formation of the capsule by thermoforming a predefined portion of the thermoformable film comprises the following sub-steps: a first sub-step of partially thermoforming the capsule so as to obtain an object having a different shape and/or dimension than that of the capsule and a second sub-step of final forming in which the capsule obtains its own final shape and/or dimension. The first sub-step of partially thermoforming the capsule is carried out by application of heat.

In the present invention, the term "partially thermoforming" indicates that the object that is obtained by partial thermoforming does not yet have its final shape and/or size. In other words, the object is only partially formed. The final shape and/or size of the capsule will thus be obtained through the second final forming sub-step. Preferably, the second sub-step takes place without supplying heat. In this case, the second sub-step can comprise a step of shaping without supplying heat. The object obtained at the end of the first sub-step of partial thermoforming is further shaped and/or deformed without supplying heat so that it obtained the desired final shape and/or size. The lack of heat supply can also be indicated in the present finding with the term "cold": therefore, when reference is made to "cold forming" or to "cold shaping" it means forming or shaping, respectively, in which heat is not supplied to the object that is formed or shaped. This embodiment in which the thermoforming is divided into two sub-steps with a first sub-step of partial thermoforming and a second sub-step of final forming, preferably without supplying heat, is particularly advantageous because it makes it possible to reduce the probability of the final size and/or shape of the capsule obtained being different from what is wanted. In particular, in this way the probability of the thermoformable material contracting following cooling at the end of the formation of the capsule is substantially reduced. Thanks to the sub-step of final forming it is ensured that the capsule is the desired shape and/or size.

According to a further embodiment of the present invention, the method further comprises a step of welding the film of thermoformable material to a rigid element. The rigid element can be made for example of biodegradable materials or of non-biodegradable materials. The rigid element can be made of polylactic acid (PLA) based materials, composites of cellulose and polylactic acid, PHA (Polyhydroxyalkanoates), composites of amide or PBS (Polybutylene succinate). The rigid element can also be made of PET (polyethylene terephthalate), PP (polypropylene), PA (polyammide) or PS (polystyrene). According to the present invention, the rigid element can for example be a reinforcing ring adapted for stabilizing and reinforcing the capsule that is obtained by thermoforming. Examples of such reinforcing rings are described in the American patent application published with number US 2011/0247975 A1. Moreover, the rigid element can also be, for example, a container adapted for containing the capsule that is obtained by thermoforming. The container can for example be impermeable and/or hermetic or in any case adapted for improving the maintaining of the organoleptic properties of the product contained in the capsule formed by thermoforming. An example of such a container can be found in European patent EP 2 490 962 B1, with reference to FIGS. 14 and 15.

Advantageously, this welding step is carried out before the thermoforming step. In this way, the rigid element can be easily welded to the film of thermoformable material instead of welding it to the final capsule obtained by thermoforming. This avoids problems of centering and/or alignment of the capsules obtained by thermoforming with the rigid elements to which they can be welded, for example to be reinforced or to be introduced into a rigid container.

According to a further embodiment of the present invention, the capsule for producing beverages is for example a capsule for producing coffee. The capsule comprises a containment volume inside which the produced used to obtain the desired beverage is contained. The capsule can for example contain infusion products to obtain beverages by infusion, like for example coffee powder, tea leaves or similar. The capsule can also contain water-soluble products to obtain beverages by dissolving, like for example milk powder, cocoa or similar.

According to a further embodiment of the present invention, the film of thermoformable material is made of a biodegradable material according to the European standard EN13432 or American standard ASTM6400. For example, the film of thermoformable material is made with polylactic acid (PLA) based materials, composites of cellulose and polylactic acid, PHA (Polyhydroxyalkanoates), composites of amide or PBS (Polybutylene succinate). According to a further embodiment of the present invention, the film of thermoformable material is made of a non-biodegradable material like for example PET (polyethylene terephthalate), PP (polypropylene) or PA (polyammide). It has been observed that these materials are the materials that have the greatest tendency to tear and/or break during and/or after thermoforming and that thus most benefit from the preheating step carried out before thermoforming.

According to a further embodiment of the present invention a machine is provided for producing capsules for obtaining beverages from a film of thermoformable material comprising a thermoforming station configured to form the capsules by thermoforming predefined portions of the film of thermoformable material, wherein the machine further comprises a heating station configured to heat the predefined portions of the film and wherein the heating station is upstream of the thermoforming station in the forward direction of the machine. The term "forward direction of the machine" is meant to indicate the direction in which the process carried out by the machine progresses and is carried out until it is complete. The fact that the heating station is upstream of the thermoforming station in this direction makes it possible to carry out the heating before thermoforming is carried out. In other words, the heating station makes it possible to carry out the pre-heating before thermoforming is carried out. The machine according to the present invention thus comprises two heating stations: a first heating station upstream of the thermoforming station and adapted for carrying out the preheating and a second heating station belonging to the thermoforming station itself.

According to a further embodiment of the present invention, a machine is provided in which no further operative stations are interposed between the heating station and the thermoforming station so that no further treatment steps on the predefined portions are interposed between the heating and the thermoforming. In this way, it is ensured that the temperature reached by the predefined portions after heating is maintained or in any case is not too low when the predefined portions will be subjected to thermoforming.

According to a further embodiment of the present invention, a machine is provided in which the thermoforming station comprises a first partial thermoforming station for partially forming the capsules by thermoforming and a second final formation station arranged downstream of the first partial thermoforming station in the forward direction of the machine so as to obtain the capsules with their final shape and/or size. Preferably, the final forming station is configured to carry out forming without supplying heat. Thanks to the final forming station arranged downstream of the partial thermoforming station the probability of the material thermoformed with supply of heat contracting in the step immediately after hot thermoforming is substantially reduced.

According to a further embodiment of the present invention, a machine is provided further comprising a welding station for welding the film of thermoformable material to one or more rigid elements, for example to reinforcing rings or to containers, each of which is adapted for containing one of the capsules obtained by thermoforming. Advantageously, the welding station is arranged upstream of the thermoforming station in the forward direction of the machine so that the rigid elements can be easily welded to the film of thermoformable material before carrying out thermoforming. In this way, the problems of alignment and/or centering of the capsules obtained by thermoforming with the relative rigid elements are avoided.

According to a further embodiment of the present invention, a drum-type machine is provided. The various stations of the machine are thus arranged along a direction curved around the drum of the machine.

BRIEF DESCRIPTION OF THE FIGURES

The present invention will be described with reference to the attached figures in which the same reference numerals and/or marks indicate the same parts and/or similar and/or corresponding parts of the system.

DETAILED DESCRIPTION

Hereinafter, the present invention is described with reference to particular embodiments, as illustrated in the attached figures. However, the present invention is not limited to the particular embodiments described in the following detailed description and represented in the figures, but rather the described embodiments simply exemplify the various aspects of the present invention, the purpose of which is defined by the claims. Further modifications and variations of the present invention will be clear to those skilled in the art.

Figure 1:
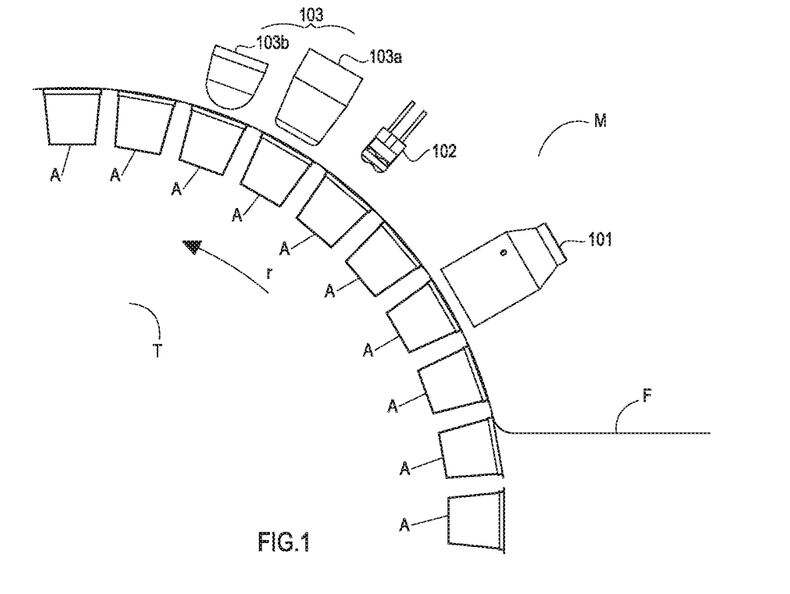
FIG. 1 schematically shows a portion of a machine according to an embodiment of the present invention.

FIG. 1 schematically shows a portion of a machine M according to an embodiment of the present invention. The machine represented in the figures is of the drum type and thus comprises a drum T that is circular in shape around which the operative stations of the machine M are arranged. The arrow r indicates the direction of rotation of the drum T when the machine is operating. This is the forward direction of the machine. However, the present invention can also be implemented on linear machines, i.e. on machines that do not comprise a drum and in which the operative stations are aligned along a substantially planar direction. In this case, the forward direction will not be circular but linear.

The drum T of the machine M comprises a plurality of housings each of which houses a rigid element A. An example of such a drum is described in European patent EP 2 152 589 B1 and in the relative PCT application published with number WO 2008/129350 A1.

In the system shown in the figures the rigid elements A are containers adapted for containing the capsules that will be formed by thermoforming. However, based on the present invention, the rigid elements A could also be reinforcing elements, for example reinforcing rings adapted for reinforcing the capsules that will be formed by thermoforming. Through the present invention, it is indeed possible to obtain capsules for beverages provided with reinforcing rings like those described for example in document US 2011/0247975 A1.

A film F of thermoformable material extracted for example from a reel not shown in the figures is slid over the surface of the drum T so as to cover the rigid elements A housed in the drum T. The film F can be made of biodegradable material or non-biodegradable material. The film F can for example be made of polylactic acid (PLA) based materials, composites of cellulose and polylactic acid, PHA (Polyhydroxyalkanoates), composites of amide and PBS (Polybutylene succinate). Moreover, the film F can be made of PET (polyethylene terephthalate), PP (polypropylene) or PA (polyammide).

The figure also schematically shows the operative stations of the machine M the functions of which will be described in detail hereinafter with reference to the following figures. It is possible to see a welding station 101, a heating station 102, and a thermoforming station 103 comprising a partial thermoforming station 103a and a final forming station 103b.

Figure 2:
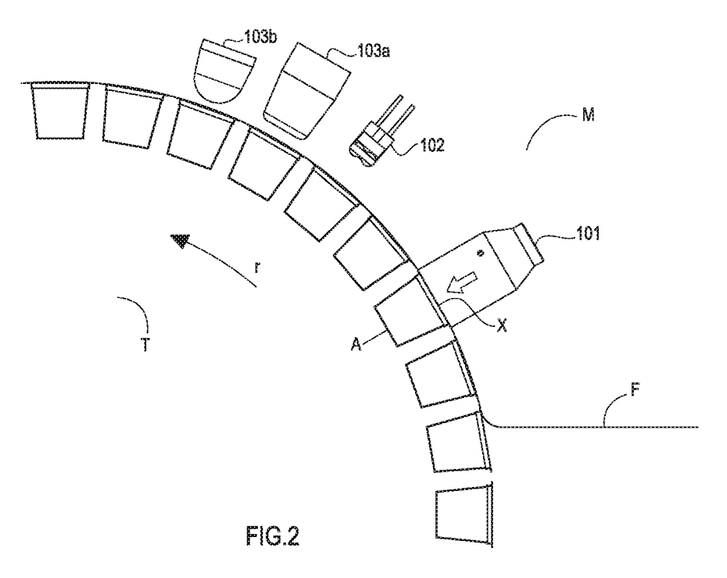
FIG. 2 schematically shows the system of FIG. 1 during a step of the method according to an embodiment of the present invention.
Figure 6:
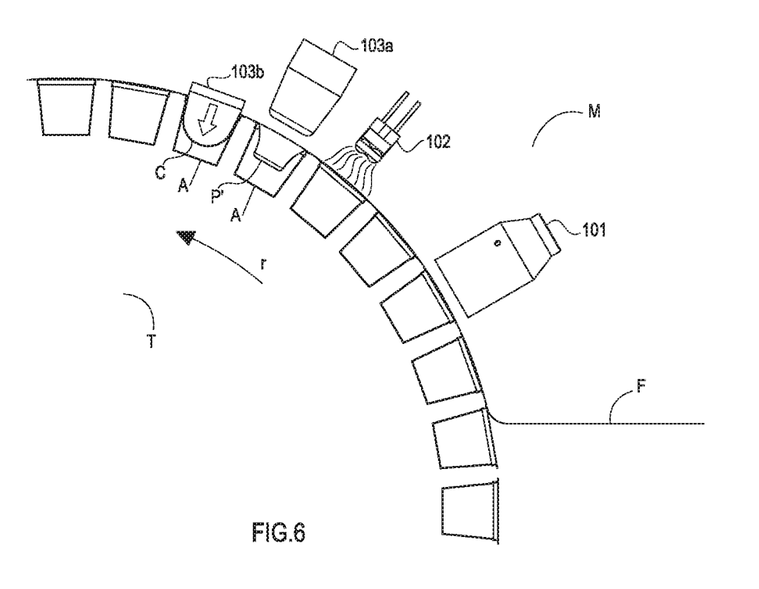
FIG. 6 schematically shows the system of FIG. 1 during a further step of the method according to an embodiment of the present invention.
Figure 7:
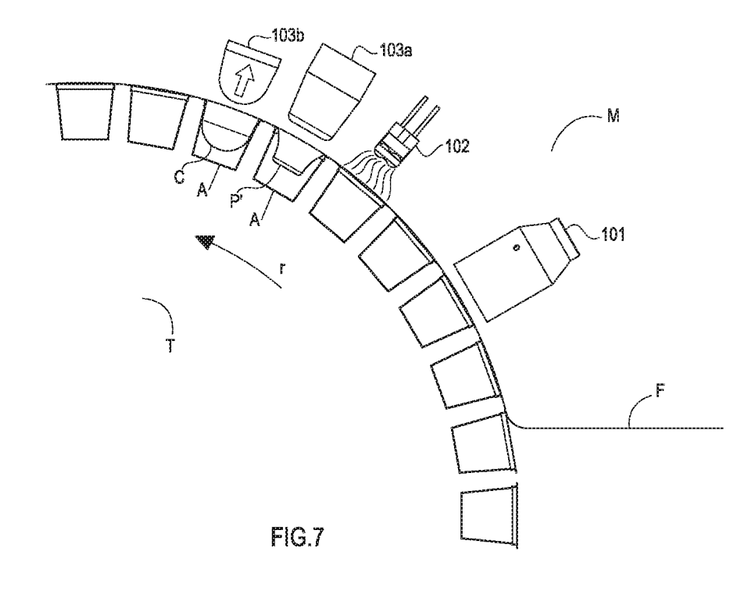
FIG. 7 schematically shows the system of FIG. 1 during a further step of the method according to an embodiment of the present invention.

FIG. 2 schematically shows the welding step of a rigid element A to the film F of thermoformable material at the welding station 101 of the machine M. The welding station 101 can for example be configured to carry out welding by means of one or more hot bars or by ultrasound. Thanks to the welding, the film F of thermoformable material is fixed to a rigid element A, in particular to the rigid element A that is located at the welding station 101 of the machine M. In this way, a predefined portion X that will be subjected to thermoforming in order to obtain the desired capsule C, illustrated in FIGS. 6 and 7, is identified and defined on the film F of thermoformable material. In the case shown in FIG. 2 in which the rigid element A is a container adapted for containing the capsule C that will be formed by thermoforming, the predefined portion X is the portion of the film F arranged directly above the container or rigid element A after it has been welded to the film and thus enclosed by the perimeter of the upper edge of the container or rigid element A. In the case for example in which the rigid elements A are reinforcing rings, the predefined portion X is the portion of film F arranged inside the perimeter of each reinforcing ring after it is welded to the film F.

Figure 3:
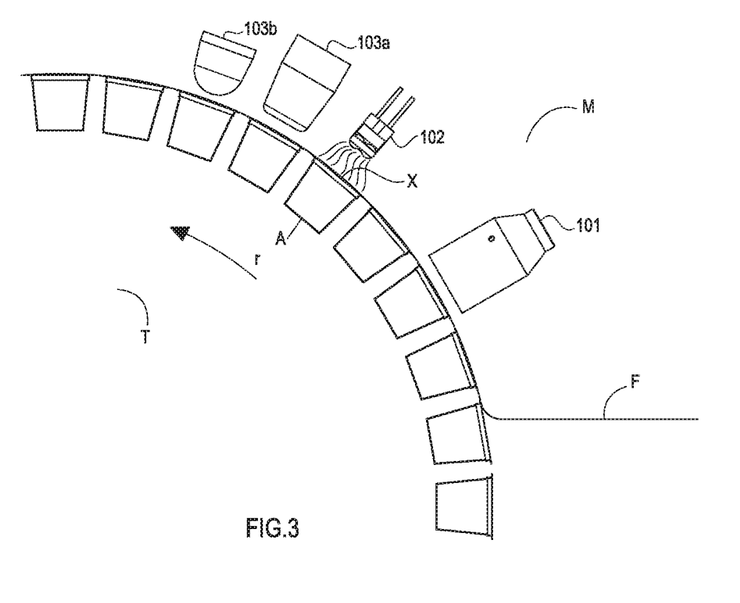
FIG. 3 schematically shows the system of FIG. 1 during a further step of the method according to an embodiment of the present invention.

FIG. 3 schematically shows the system during a subsequent step with respect to the one shown in FIG. 2.

In the step shown in FIG. 3, the predefined portion X of the film of thermoformable material is subjected to heating at the heating station 102 of the machine M. The heating station 102 can for example be configured to carry out heating through infrared radiation (IR) or through one or more hot bars or by means of a blast of hot air or other suitable heating systems. The heating can be done in such a way that the portion X of the film F reaches a temperature greater than or equal to 50° C. and/or less than or equal to 80° C. The machine M can be advantageously provided with systems for detecting the temperature of the portion X at the heating station 102. Moreover, the machine M can be advantageously provided with systems for controlling the temperature configured so as to regulate the temperature of the portion X based on the detection of the temperature itself. The control means can for example interrupt the heating of the portion X when a predefined target temperature is reached. Moreover, the control means can also be configured to increase and/or decrease the intensity of the heat supplied to the system.

Figure 4:
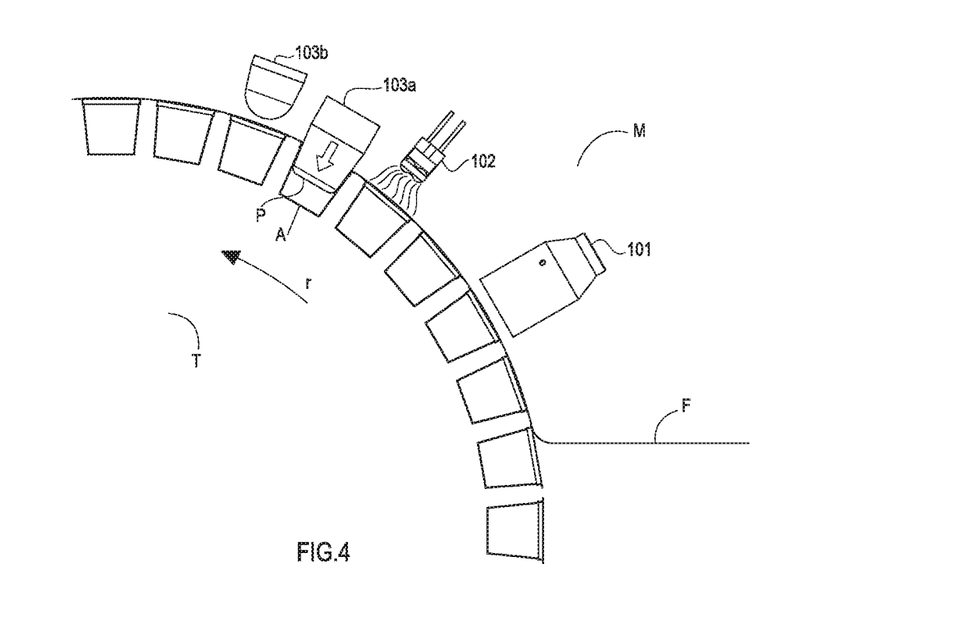
FIG. 4 schematically shows the system of FIG. 1 during a further step of the method according to an embodiment of the present invention.

FIG. 4 schematically shows the system during a subsequent step with respect to the one shown in FIG. 3.

Figure 5:
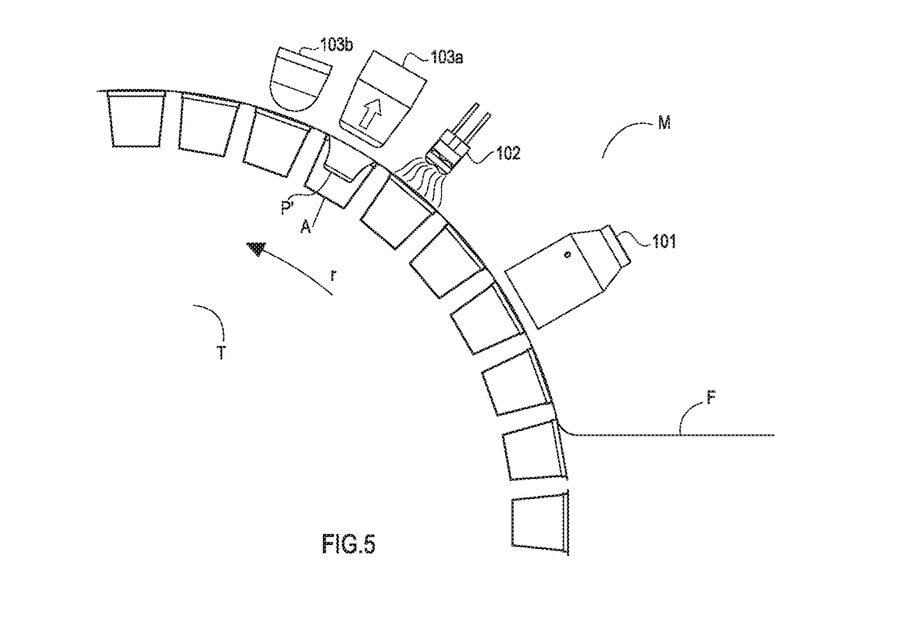
FIG. 5 schematically shows the system of FIG. 1 during a further step of the method according to an embodiment of the present invention.

In the step shown in FIG. 4, the predefined portion X of the film of thermoformable material that has been preheated by the heating station 102 is subjected to hot thermoforming at the station 103a. The thermoforming can for example be such that, during the thermoforming, the portion X of the film of thermoformable material is heated to a temperature which is higher than or equal to 100° C. and/or lower than or equal to 190° C. Given that the portion X has been preheated at the heating station 102, the probability of the portion X tearing during this hot thermoforming step at the station 103a is substantially reduced. In the example shown in FIG. 4, the station 103a is a partial thermoforming station. In particular, the object P that is obtained at the station 103a through partial thermoforming does not yet have the final shape and/or size of the final capsule C that it is wished to produce. The object P has thus only been partially formed and is of a different shape and/or size with respect to the final capsule C that it is wished to produce. FIG. 5 schematically shows a possible result after the thermoforming procedure at the station 103a has been completed. In particular, FIG. 5 shows that the object P' is obtained after the contraction of the object P during the cooling thereof at the end of the thermoforming. In particular, it has been observed that often, in the step immediately after thermoforming when the hot thermoforming mould is removed, the thermoformed and dilated material tends to contract after the cooling of the system and to thus produce a capsule with a smaller inner volume than the desired volume.

In order to avoid this problem, as is schematically shown in FIG. 6, the object P' that is contracted with respect to the object P obtained by partial thermoforming at the station 103a is subjected to a final forming step at the final forming station 103b so as to obtain the desired shape and/or Ia size of the capsule C that is wished to be produced. The final forming or shaping step can advantageously take place cold, i.e. without supplying heat. The forming or shaping from the object P' to the capsule C is in this case carried out exclusively through pressure or force exerted at the final forming station 103b, for example by a suitable molder or mould.

It should also be noted that it has also been observed that the tearing or breaking of the thermoformable material often takes place in the step shown schematically in FIG. 5 after the excessive thermal shock and the forming force. The preheating carried out at the station 102 upstream of the partial thermoforming station 103a substantially reduces the probability of the material tearing in the step shown in FIG. 5. The cold forming carried out at the station 103b does not generally have problems of tearing.

As schematically shown in FIG. 7, when the moulder of the forming station 103b is withdrawn, the capsule C is obtained with the desired shape and size. In the case shown in the figure, the capsule C of thermoformable material is located inside the container of rigid material A.

Although the present invention has been described with reference to the embodiments described above, it is clear to those skilled in the art that it is possible to make different modifications, variations and improvements of the present invention in light of the teaching described above and in the attached claims, without departing from the object and the scope of protection of the invention.

For example, although in the figures shown the welding of the film F to the rigid elements is carried out before the thermoforming, according to alternative embodiments of the present invention, the welding can also take place after the thermoforming and the welding station can thus be arranged downstream of the thermoforming station or even in a second machine separate from the machine based on the present invention.

Moreover, it is clear to those skilled in the art that although the various steps have been described in sequence, they can be carried out simultaneously on different portions of the film F so as to accelerate the production of the capsules C.

Moreover, although a drum machine has been described, the invention can also be implemented in linear systems.

The reinforcing elements are not limited to the impermeable containers shown in the figures but can be of various types, for example reinforcing rings.

Moreover, although in the attached figures it is shown that the heating that precedes the thermoforming is carried out at a heating station arranged upstream of the thermoforming station, based on the method according to a particular embodiment of the present invention, the heating that precedes the thermoforming can be carried out directly at the thermoforming station. For example, in this case the heating can be carried out by blasting hot air directly at the thermoforming station. In other words, in this case, the portions of the film of thermoformable material are heated twice directly at the thermoforming station: a first heating is the heating that precedes the thermoforming and a second heating is the heating of the thermoforming itself.

Finally, things that are deemed to be known by those skilled in the art have not been described in order to avoid needlessly obscuring the invention described.

For example, the drum machine has not been described in detail in all of its aspects or functions. An example of such a machine can, however, be found for example in WO 2008/129350 A1.

Moreover, further steps that can be carried out after the steps described in detail above have not been described in detail. For example, the capsule C can be cut from the film of thermoformable material F at a cutting station so as to separate the capsule from the film F. Moreover, the capsule can be filled with the desired product at a filling station. The filled capsule can then be sealed, for example with a film of impermeable material. These steps can be carried out in any order. Moreover, one or more of these steps can be carried out directly on the machine based on the present invention that will thus be equipped with the suitable operative station or on one or more further separate machines with respect to the machine according to the present invention. For example, a machine according to the present invention could make it possible to obtain the empty capsules C, welded or not to the rigid elements A. The empty capsules C could then be supplied to a second machine for filling with the desired product and subsequent sealing.

Consequently, the invention is not limited to the embodiments described above, but is only limited by the scope of protection of the attached claims.

What is claimed is:

1. A method for producing a capsule for obtaining beverages from a film of thermoformable material having a thermoforming temperature comprising the following steps:
   welding a predefined portion of the film to one rigid element; and additionally
   pre-heating the predefined portion of the film to a pre-heating temperature lower than the thermoforming temperature without any forming, by means of a first heating system, wherein the pre-heating temperature ranges from 50° C. to 80° C. and the thermoforming temperature ranges from 100° C. to 190° C., and afterwards;
   forming the heated predefined portion so as to form the capsule by thermoforming,
   wherein the thermoforming comprises a step of heating the predefined portion of the film to the thermoforming temperature by means of a second heating system and a step of forming the predefined portion into a different shape so as to obtain the capsule, wherein said second heating system is different from said first heating system, and
   wherein no further treatment steps are interposed on the predefined portion between said step of pre-heating and said step of forming by thermoforming,
   so that the predefined portion is subjected to a welding step and two heating steps.

2. The method according to claim 1, wherein a maximum temperature reached by the predefined portion following said step of pre-heating is in a range from 50% to 100% of the maximum temperature reached by the predefined portion during said step of formation of the capsule by thermoforming.

3. The method according to claim 1, wherein said step of pre-heating is such that the predefined portion of the film reaches a temperature which is higher than or equal to 50° C. and/or lower than or equal to 80° C.

4. The method according to claim 1, wherein said step of forming the heated predefined portion of the film comprises the following sub-steps:
   a first sub-step of partial thermoformation so as to obtain an object having a shape and/or a dimension which is different from the shape and/or dimension, respectively, of the capsule; and
   a second sub-step of final formation so as to obtain the capsule from the object.

5. The method according to claim 1, further comprising the following step:
   welding the film of thermoformable material to a rigid element.

6. The method according to claim 1, wherein the film of thermoformable material is made of material, selected from the group consisting of polylactic acid (PLA) based materials, cellulose and polylactic acid composites, PHA (Polyhydroxyalkanoates), amide compounds, PBS (Polybutylene succinate), PET (polyethylene terephthalate), PP (polypropylene) and PA (polyammide).

7. The method according to claim 4 wherein:
   said second sub-step of final formation is performed without supplying heat.

8. The method according to claim 1, wherein said step of pre-heating is carried out through infrared radiation or through one or more hot bars or by means of a blast of hot air.

9. The method according to claim 1, wherein:
   said step of pre-heating is performed after said step of welding and said step of pre-heating heats the predefined portion of the film to reach the pre-heating temperature lower than the thermoforming temperature without any forming,
   whereby the probability of the film breaking during and after thermoforming is minimized.

10. A method of forming a capsule from a film of thermoformable material having a thermoforming temperature comprising the steps of:
    welding a predefined portion of the film to one rigid element; and additionally after said step of welding,
    pre-heating a portion of the film of thermoformable material to a pre-heating temperature lower than the thermoforming temperature at a heating station without any forming, wherein the pre-heating temperature ranges from 50° C. to 80° C. and the thermoforming temperature ranges from 100° C. to 190° C.;
    moving the portion of the film of thermoformable material to a partial thermoforming station with no further treatment steps interposed before forming the portion;
    thermoforming the portion of the film of thermoformable material into a different shape at the thermoforming temperature, wherein the thermoforming temperature is higher than the pre-heating temperature; and
    forming the portion of the film of thermoformable material in the different shape into a final shape at a forming temperature less than the thermoforming temperature.

11. The method of forming a capsule from a film of thermoformable material as in claim 10 wherein:
    the pre-heating temperature is greater than one-half of the thermoforming temperature.

12. The method according to claim 10, wherein said step of pre-heating is carried out through infrared radiation or through one or more hot bars or by means of a blast of hot air.

13. A method of forming a capsule from a film of thermoformable material having a thermoforming temperature at a thermoforming station comprising the steps of:
    pre-heating a portion of the film of thermoformable material having the thermoforming temperature to a pre-heating temperature lower than the thermoforming temperature ranging from 50° C. to 80° C. without any forming;
    moving the portion of the film of thermoformable material to the thermoforming station;
    hot thermoforming the portion of the film of thermoformable material into a different shape at the thermoforming temperature ranging from 100° C. to 190° C.; and
    forming the portion of the film of thermoformable material in the different shape into a final shape by cold forming without supplying heat.

14. A method of forming a capsule from a film of thermoformable material at a thermoforming station as in claim 13 wherein:
    no forming of the portion of film of thermoformable material is interposed between said step of pre-heating and said step of hot thermoforming.

* * * * *